(12) United States Patent
Ferlin

(10) Patent No.: US 7,252,128 B2
(45) Date of Patent: Aug. 7, 2007

(54) TIRE FOR HEAVY VEHICLES

(75) Inventor: Oliver Ferlin, Malauzat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 4 days.

(21) Appl. No.: 11/034,722

(22) Filed: Jan. 14, 2005

(65) Prior Publication Data
US 2005/0121129 A1 Jun. 9, 2005

Related U.S. Application Data

(63) Continuation of application No. PCT/EP03/07366, filed on Jul. 9, 2003.

(30) Foreign Application Priority Data
Jul. 15, 2002 (FR) .................................. 02 08929

(51) Int. Cl.
B60C 9/22 (2006.01)

(52) U.S. Cl. ...................... 152/527; 152/531; 152/532; 152/533; 152/537

(58) Field of Classification Search ................ 152/527, 152/537, 531–533
See application file for complete search history.

(56) References Cited

U.S. PATENT DOCUMENTS

| | | | | |
|---|---|---|---|---|
| 2,982,328 A | * | 5/1961 | Luigi et al. ................. | 152/527 |
| 5,054,532 A | * | 10/1991 | Kohno et al. ............... | 152/527 |
| 5,225,013 A | | 7/1993 | Ohsawa et al. | |
| H001333 H | * | 7/1994 | Helfer et al. ........... | 152/527 X |
| 5,738,740 A | * | 4/1998 | Cluzel ........................ | 152/527 |
| 5,879,483 A | * | 3/1999 | Gerresheim et al. .... | 152/531 X |
| 6,082,425 A | | 7/2000 | Colom | |
| 6,082,426 A | * | 7/2000 | Colom ........................ | 152/527 |
| 6,386,256 B1 | | 5/2002 | Colom | |
| 6,533,012 B1 | * | 3/2003 | Jardine et al. .............. | 152/527 |
| 6,659,147 B1 | * | 12/2003 | Cordonnier ............. | 152/531 X |
| 2004/0256044 A1 | * | 12/2004 | Riva et al. .................. | 152/527 |

FOREIGN PATENT DOCUMENTS

| | | | |
|---|---|---|---|
| JP | 06-191219 | | 7/1994 |
| JP | 10044713 A | * | 2/1998 |
| JP | 10236108 A | * | 9/1998 |
| JP | 11020405 A | * | 1/1999 |
| JP | 11099807 A | * | 4/1999 |
| JP | 11198605 A | * | 7/1999 |
| JP | 2000255214 A | * | 9/2000 |
| JP | 2001213117 A | * | 8/2001 |
| JP | 2001294016 A | * | 10/2001 |
| WO | WO 99/24270 | | 5/1999 |
| WO | WO 01/90478 | | 11/2001 |

* cited by examiner

Primary Examiner—Adrienne C. Johnstone
(74) Attorney, Agent, or Firm—Buchanan Ingersoll & Rooney PC

(57) ABSTRACT

A tire includes a radial carcass reinforcement radially surmounted by a crown reinforcement composed of at least two working crown plies formed of metallic reinforcement elements crossed from one ply to the next and forming with the circumferential direction angles of between 10 and 35°. Also provided is at least one additional reinforcement, formed of at least two circumferentially oriented layers of metallic elements of a compacted diameter at most equal to 0.6 mm.

8 Claims, 2 Drawing Sheets

TIRE FOR HEAVY VEHICLES

This application is a Continuation of International PCT/EP03/007366 filed on Jul. 9, 2003 and published in the French language under WO 2004/007220 on Jan. 22, 2004.

BACKGROUND

The invention relates to a tyre with radial carcass reinforcement anchored within each bead to at least one bead wire, and comprising a crown reinforcement constituted by at least two plies known as working plies, radially superposed and formed of reinforcement elements which are parallel to each other within each ply and crossed from one ply to the next, forming with the circumferential direction of the tyre angles whose value may be of between 10 and 35° in absolute value.

In numerous cases, the Applicant has found that several quality criteria relating to the tyre in question, in particular for use on heavy vehicles, may be improved by the presence in the crown reinforcement, radially between said working crown plies, of an additional ply formed of metallic elements oriented substantially parallel to the circumferential direction.

Mention may be made of application FR 2 744 954 (corresponding to Colom U.S. Pat. No. 6,082,425) which, with a view to reducing the operating temperature of a heavy goods vehicle tyre (tire) by means of an economic and effective solution, recommends using an additional ply of circumferential reinforcement elements having an axial width at least equal to 1.05 times the width of the widest working ply, the reinforcement elements of said additional ply having a larger diameter than the diameter of the elements of the working plies.

In the above context, the additional ply may be formed of continuous steel cables referred to as semi-elastic, that is to say cables exhibiting relative elongation at break of greater than 2%. These cables allow the achievement of a level of rigidity suitable for harmonious distribution of circumferential tension between the working crown plies and the additional ply. Said cables are advantageously described as "bi-modulus", that is to say exhibiting a curve, representing tensile stress as a function of relative elongation, having gentle slopes for slight elongations and a substantially constant, sharp slope for greater elongations. The very low modulus prior to curing, for elongations of less than 2%, makes it possible to increase the circumferential extent of the additional ply during curing of the tyre.

The additional ply may also be formed of metal cables made of steel oriented circumferentially and cut so as to form sections of a much smaller length than the circumferential length of the ply, the cuts between sections being axially offset relative to one another. Such an embodiment makes it possible to impart simply to the additional ply the rigidity desired, whatever that may be.

The choice of elastic or cut cables for reinforcing the additional ply does not provide said ply with the best resistance to fatigue, respectively as a consequence of a reduction in the breaking load of the elastic cables, or as a consequence of the existence of stress concentrations in the calendering mix of the cut cables.

International application WO 99/24 270 teaches that better resistance to separation between carcass ply and crown reinforcement, and between crown plies, and resistance to fatigue of the circumferential reinforcement elements of the additional ply may be obtained by using as reinforcement elements for the additional ply circumferentially continuous metallic elements undulating in the plane of the ply, the undulations of said elements being parallel to each other, in phase and oriented circumferentially such that the ratio a/λ of the amplitude a to the wavelength λ decreases axially from the centre to the edges of said ply so as to be minimal at said edges.

From reading the two documents cited above, it is clear that the reinforcement elements of said additional ply are preferably metal cables of steel with a larger diameter than that of the reinforcement elements of the two radially adjacent working plies. Whereas the structure described in the first cited document (use of semi-elastic reinforcement elements or cut elements) impairs the tensile strength and endurance of the additional ply itself, the structure described in the second cited document (undulating reinforcement elements) is difficult to implement and in particular increases manufacturing costs substantially, said additional ply being obtained by helical winding of the reinforcement element around a former until the total width of the ply is obtained.

OBJECTS AND SUMMARY OF PREFERRED EMBODIMENTS

The invention aims to remedy the above drawbacks, and advocates a solution which allows better resistance to separation and endurance than those obtained with the cut-up reinforcement elements used previously, while avoiding manufacturing problems and minimising the costs relating to the use of thick undulating cables.

The tyre according to the invention comprises a radial carcass reinforcement radially surmounted by a crown reinforcement composed of at least two working crown plies formed of metallic reinforcement elements crossed from one ply to the next and forming with the circumferential direction angles of between 10 and 35°, and by at least one additional reinforcement, formed of circumferentially oriented metallic reinforcement elements, said additional reinforcement being formed of at least two layers of metallic elements of a compacted diameter at most equal to 0.6 mm.

The circumferential direction of the tyre, or longitudinal direction, is the direction corresponding to the periphery of the tyre and defined by the rolling direction of the tyre.

The transverse or axial direction of the tyre is parallel to the axis of rotation of the tyre.

The additional reinforcement may be formed of at least two plies of small diameter elements, each ply having two edges overlapping circumferentially. It may also be produced by winding a single ply so as to form at least two layers, the reinforcement having no more than two free edges, at the start and end of winding. The free edges constitute particular points, or zones, which, according to the invention, do not entail irregular wear of the tyre as a result of the diameter of the reinforcement elements.

Layers of rubber mix are advantageously provided radially to the inside and/or to the outside of the ends of the layers of small diameter reinforcement elements of the additional reinforcement in accordance with the axial width of said layers of reinforcement elements. These layers of rubber mixes allow said ends of the plies to be decoupled radially on contact.

Production of the additional reinforcement from one or more plies having the width of the reinforcement to be produced has the advantage in procedural terms of setting said reinforcement in place in a few turns. From the point of view of productivity and therefore economic viability, it would appear that the tyre according to the invention is simpler to implement and quicker to produce than tyres involving positioning of a cord or strips by helical winding. Furthermore, with the tyre according to the invention the reinforcement elements of the circumferential reinforcement are set in place at an angle of precisely zero relative to the circumferential direction and not at a small angle slightly greater than 0°.

Reinforcement elements more particularly adapted to implementation of the invention are assemblies of SHT (Super High Tensile) steel of the type 1×n, n being between 2 and 5, and the diameter of the wires being between $12/100$ and $30/100$ mm and preferably greater than $15/100$ mm. The reinforcement elements are therefore advantageously strands combining n elementary cords whose characteristics are those which have just been stated.

Like any circumferential element reinforcement, and so as to be able to manufacture the tyre in question in the simplest possible manner and at the lowest possible cost, the reinforcement, according to the invention, must display for the slight tensile forces imparted parallel to the direction of the reinforcement elements a certain relative elongation, necessary if it is to be possible to achieve a greater circumferential extent of the crown reinforcement during the operations of building, finishing and vulcanising the tyre.

In the above context, according to a first variant embodiment of the invention, the additional reinforcement is formed of layers or plies of reinforcement elements which have been divided, that is to say cut to form sections or sets of sections smaller in length than the circumferential length of a ply or layer, the cuts between sections or sets of sections being offset circumferentially relative to one another.

According to one advantageous embodiment of this variant of the invention, the reinforcements are divided into 3 to 12 fractions per turn.

According to this variant embodiment of the invention, in which the reinforcement elements are positioned in two dimensions, the first being the axial direction and the second the radial direction, the zones where the reinforcement elements are absent are better distributed than in the case of strips or cords distributed over a single layer. More precisely, fewer zones without reinforcement element are present on a single axial or meridian line of the tyre.

According to a second variant embodiment of the invention, the length per turn of the reinforcement elements of the additional reinforcement is, in the plane of each layer, greater by 0 to 3% than the laying length of said elements. In other words, the residual elongation over the tyre is less than 3%, residual elongation being the ratio of the difference between the length of the reinforcement elements per turn and the laying distance, or length of a turn, to said laying distance. This difference between the length of the reinforcement elements and the laying length is advantageously distributed periodically and uniformly over a turn. The length per turn of the reinforcement elements of the additional reinforcement is, in the plane of each layer, preferably greater by 0 to 2% than the laying length of said elements and preferably indeed greater than 1 to 1.4%.

According to this second variant, the additional reinforcement is advantageously formed of undulating elements in the plane of each ply or layer, by arranging the elements along a defined sinusoidal path whose wavelength is between 20 and 100 mm.

According to this second variant embodiment of the invention, the additional ply is advantageously produced with reinforcing elements disposed longitudinally and it is the ply itself which is set in place in undulating manner as described above. Such undulation may be produced by any means known to the person skilled in the art.

According to another variant embodiment of the invention, the additional reinforcement is formed of layers of metallic reinforcement elements displaying a tensile stress curve as a function of relative elongation having gentle slopes for gentle elongations and a substantially constant, sharp slope for the greater elongations.

According to one advantageous embodiment of the invention, the additional reinforcement is positioned between the two working crown plies.

In accordance with this embodiment, the additional reinforcement is less than 2.4 mm thick. Beyond this value, compression or extension of the reinforcement elements during travel results in a risk of deterioration.

According to another embodiment of the invention, the additional reinforcement is positioned above the working crown plies. According to this type of embodiment, the additional ply may take the place of a protective ply. In effect, the properties of the additional ply and more particularly the diameter of its reinforcement elements ensure that the rubber or rubber compound can penetrate between the cables forming the reinforcement elements, such that the additional ply is protected sufficiently in particular against corrosion, so making the presence of a protective ply superfluous if the latter is required in particular for this property.

BRIEF DESCRIPTION OF THE DRAWINGS

Other advantageous details and features of the invention will become clear below from the description of examples of embodiment made with reference to FIGS. 1 to 3, in which.

Figure 1:
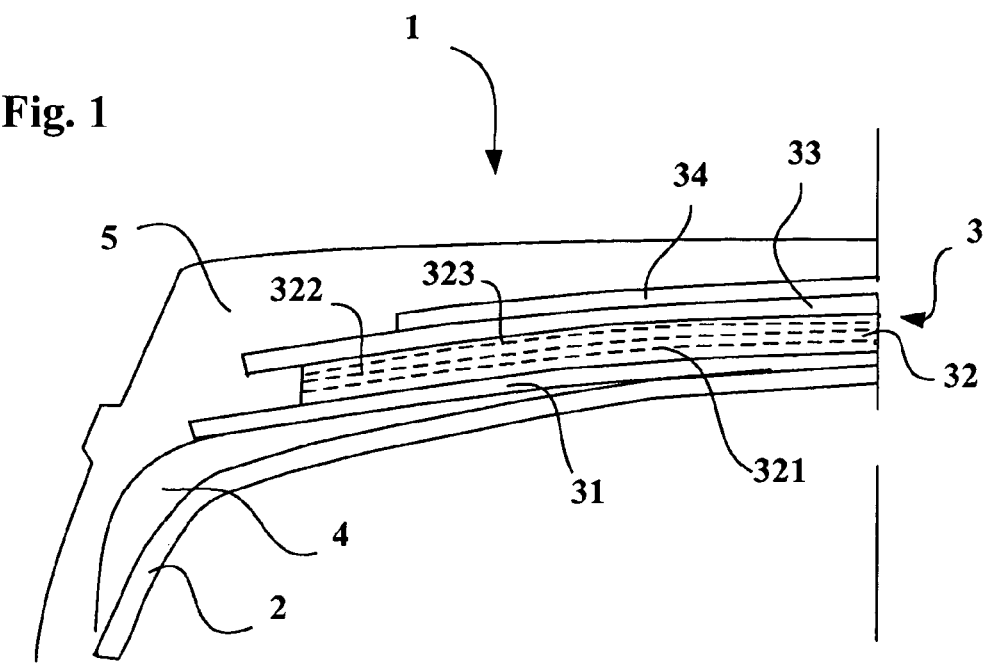
FIG. 1 is a view in meridian section of a diagram of a crown reinforcement according to the invention.

To simplify understanding thereof, the Figures are not to scale.

DETAILED DESCRIPTION OF PREFERRED EMBODIMENT

Figure 3:
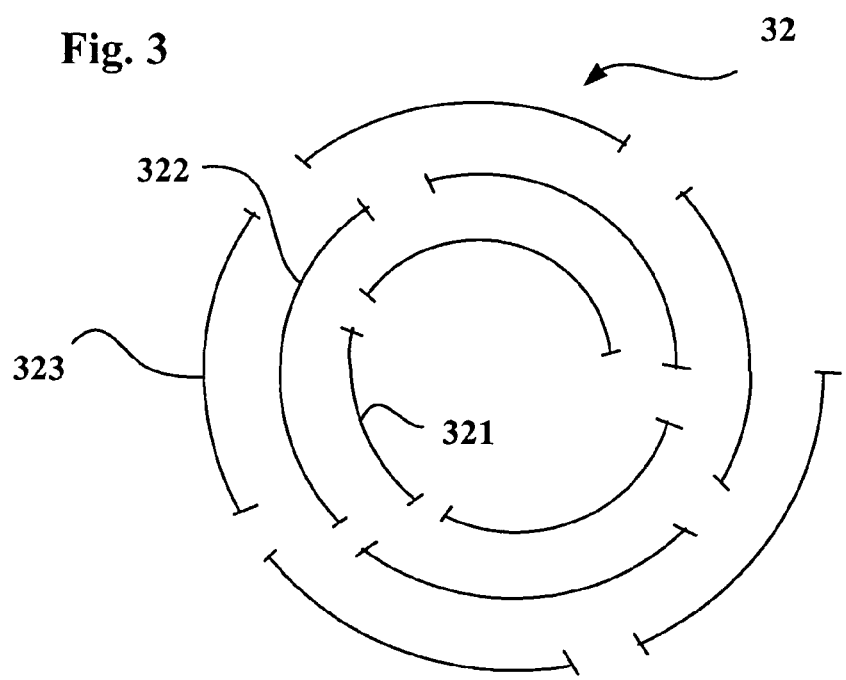
FIG. 3 is a profile view of the additional reinforcement.
Figure 2:
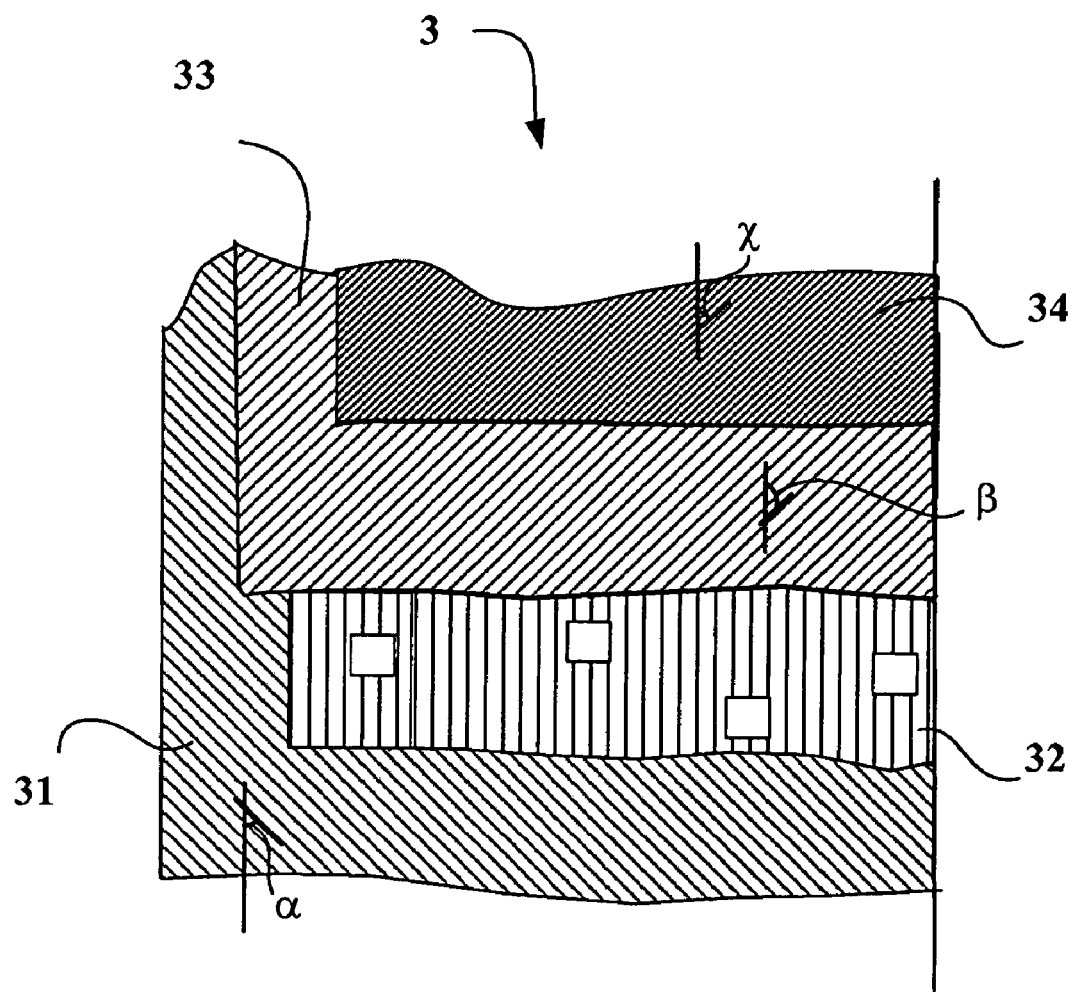
FIG. 2 is a cut-away plan view of a reinforcement.

The tyre 1, of dimension 315 70 R22.5 X, comprises a radial carcass reinforcement, formed of a single ply 2 of non-stretch metal cables, anchored within each bead to at least one bead wire by forming a turn-up by winding around said bead wire (not shown). Said carcass reinforcement 2 is radially surmounted by a crown reinforcement 3, itself surmounted by a tread 5. The crown reinforcement 3 is composed radially from the inside to the outside:

of a first working crown ply 31 formed of hoop-wrapped 27×23 non-stretch metal cables of steel, (non-stretch cables are those which, under a force equal to 10% of their breaking load, exhibit a relative elongation at most equal to 2%), said cables having a diameter of 1.3 mm and being parallel to one another in the ply and disposed with a pitch of 2.5 mm (measured perpendicularly to said cables). Said cables are oriented relative to the circumferential direction at an angle α (FIG. 2) of between 10° and 35° and in the case described equal to 18°. Said first ply 31 is separated radially at its edges from the subjacent carcass reinforcement 1 by substantially triangular profiles 4 of rubber mix, which allows a meridian profile of said ply 31 of virtually zero curvature;

of an additional reinforcement 32, surmounting radially the first working ply 31 and formed of three layers 321, 322, 323 obtained by winding around the working ply 31 a ply 32 consisting of sets of five non-hoop-wrapped, non-stretch, circumferential, metal cable sections of SHT 3×18 steel (cables are described as circumferential when they form with the circumferential direction an angle in the range of 0°±2.5°), of a compacted diameter of 0.4 mm and separated from one another by a pitch of 0.7 mm. The cuts have a length which is clearly and deliberately exaggerated in FIG. 3 so as to show readily said cuts for the three winding turns;

the additional reinforcement 32 being covered by the second working crown ply 33 formed of 27×23 hoop-wrapped metal cables identical to those of the first ply 31, disposed at the same pitch and forming with the circumferential direction an angle β, opposite to the angle α of the cables of the first ply and in the case described equal to said angle α (but possibly being different from said angle α);

the crown reinforcement 3 being completed by a ply 34 of metal cables made of steel E23 and described as elastic, oriented relative to the circumferential direction by an angle χ of the same direction as the angle β and equal to said angle β (but capable of being different), said ply 34 being a so-called protective ply, and the elastic cables being cables having at break a relative elongation of greater than 4%.

Such a structure is easy to produce due to the use of small diameter cables (ply made by calendering of n parallel cables), easy to cut, easy to wind, and furthermore, due to the better impregnation of the cables by the calendering rubber, the appearance of rubber cracks at the ends of cables at the location of the cuts between sections under the effect of the stresses undergone is delayed, without their spread being more rapid, leading to a significant gain in kilometres travelled.

Excellent results may also be obtained by replacing the three layers of section sets with three layers of cables undulating in the plane of each layer. Said cables have, for example, at the centre of each layer of the additional reinforcement undulations corresponding to a residual elongation of 0.5% and a wavelength λ equal to 30 mm. Just as it is possible to vary axially the extension rigidity per unit length of a layer of cable sections, by acting on the number of cuts or on the length of the sections, it is possible to cause a variation in rigidity per unit length by reducing the amplitude a of the undulations: it is preferable for the amplitude a to be smaller at the edges of the winding layers than at the centres of said layers.

The results obtained according to the invention show that the tyre has properties in particular in terms of endurance which are entirely comparable to the best products available previously but with markedly reduced manufacturing costs. In effect, the use of small diameter reinforcements, and thus the production of an additional circumferential ply constituted by winding a single ply or superposition of two plies or more, on the one hand allows simplified manufacture at lower cost and on the other hand improves the endurance properties of the tyres relative to the techniques described previously.

The invention claimed is:

1. A tire P comprising a radial carcass reinforcement radially surmounted by a crown reinforcement composed of at least two working crown plies formed of metallic reinforcement elements crossed from one ply to the next and forming, with the circumferential direction, angles of between 10 and 35°, and by at least one additional reinforcement, formed of circumferentially oriented metallic reinforcement elements, wherein the additional reinforcement is formed of at least two layers of metallic elements of a compacted diameter at most equal to 0.6 mm, wherein the length per turn of the reinforcement elements of the additional reinforcement is, in the plane of each layer, greater by 0 to 3% than the laying length of said elements, wherein the reinforcement elements of the additional reinforcement undulate in the plane of each layer, the wavelength of the undulations being between 20 and 100 mm and wherein the additional reinforcement is positioned radially between the two working plies.

2. A tire according to claim 1, wherein the additional reinforcement is produced by winding a single ply so as to form at least two layers of metallic elements.

3. A tire according to claim 1, wherein the crown reinforcement comprises layers of rubber mix radially to the inside and/or to the outside of the ends of the layers of reinforcement elements of the additional reinforcement in accordance with the axial width of said layers of reinforcement elements.

4. A tire according to claim 1, wherein the additional reinforcement is formed of layers of divided metallic reinforcement elements, the sections or sets of sections being of a smaller length than the circumferential length of a layer and wherein the cuts between sections or sets of sections are offset circumferentially and axially relative to one another.

5. A tire according to claim 1, wherein the length per turn of the reinforcement elements of the additional reinforcement is, in the plane of each layer, greater by 0 to 2% than the laying length of said elements, and preferably greater by 1 to 1.4%.

6. A tire according to claim 1, wherein the additional reinforcement is formed of layers of metallic reinforcement elements displaying a tensile stress curve as a function of relative elongation having gentle slopes for gentle elongations and a substantially constant, sharp slope for the greater elongations.

7. A tire according to claim 1, wherein the additional reinforcement is less than 2.4 mm thick.

8. A tire according to claim 1, wherein the metallic reinforcements of the additional reinforcement are assemblies of Super High Tensile steel of the type 1×n, n being between 2 and 5, and the diameter of the wires being between 12/100 and 30/100 mm.

\* \* \* \* \*